No. 794,329.  
PATENTED JULY 11, 1905.
W. A. WHITEHOUSE.  
FINGER GUARD FOR PENHOLDERS OR PENCILS.  
APPLICATION FILED JAN. 16, 1905.
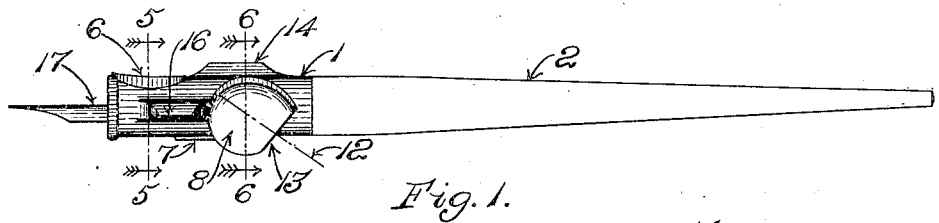
Fig. 1.
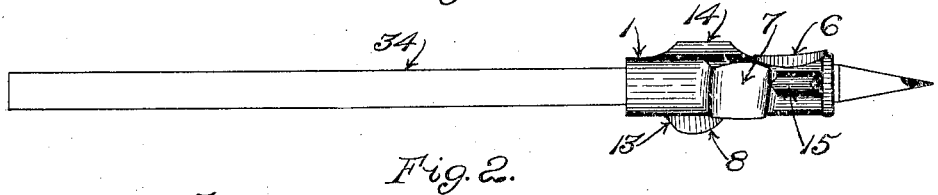
Fig. 2.
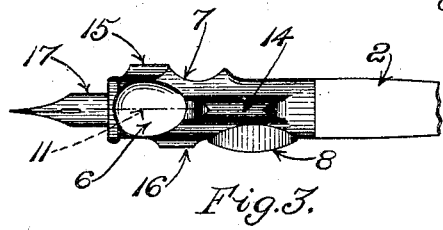 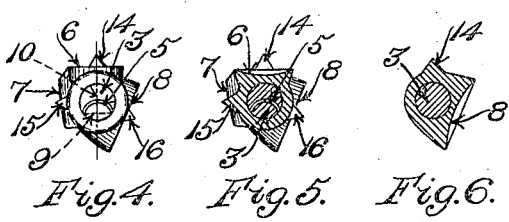
Fig. 3.   Fig. 4.   Fig. 5.   Fig. 6.
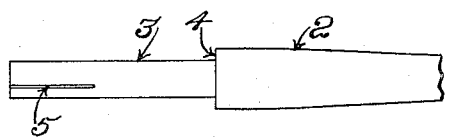
Fig. 7.
Witnesses:  
J. Henry Parker  
George T. Dike
Inventor:  
William A. Whitehouse  
by William A. Copeland  
Attorney.

No. 794,329. Patented July 11, 1905.

UNITED STATES PATENT OFFICE.

WILLIAM A. WHITEHOUSE, OF SOMERVILLE, MASSACHUSETTS.

FINGER-GUARD FOR PENHOLDERS OR PENCILS.

SPECIFICATION forming part of Letters Patent No. 794,329, dated July 11, 1905.

Application filed January 16, 1905. Serial No. 241,246.

*To all whom it may concern:*

Be it known that I, WILLIAM A. WHITEHOUSE, of Somerville, in the county of Middlesex and State of Massachusetts, have invented certain new and useful Improvements in Finger-Guards for Penholders or Pencils, of which the following is a specification.

The invention relates to a new and useful guard to be attached to a penholder or a pencil, which shall be of great use to those who are skilled in the art of penmanship, but will be of still greater value to those who are unskilled in the art. It has long been recognized by those interested in good penmanship, especially by those engaged in teaching penmanship, that it is important that the pen should be correctly held and that it is also indispensable to the beginner that the penholder should be of proper shape and size.

Formerly improvements to aid in penholding were based on the idea that the pencil or penholder or appliance should be so contructed as to give perfect freedom to the fingers and thumb, thus allowing the user to adjust them at will. During years of experience in teaching the young to write I have carefully noted the beginners' penholding and have carefully watched their developments. The beginner has no fixed habit as to penholding; but in course of time a set or fixed habit will be formed, being good or bad. It will be of great aid in forming a correct habit to have some device which shall make it very comfortable when the fingers are in correct position and not so easy and comfortable when they are out of place. I have discovered that a large proportion of beginners at first hold the fingers and thumb in a certain manner and that this "certain manner" is the one which is best adapted to the work required of them—that is, it is the best manner of holding the pen or pencil. This certain manner will become a fixed habit if young pupils are for a time given a suitable penholder or pencil guard; but with the use of the ordinary penholder or pencil the correct manner of holding which the pupil first practiced naturally soon gives way to unnatural and incorrect position. Therefore the penholder or pencil should be so constructed or provided with a guard as to dictate to the user the manner in which the fingers and thumb should clasp the holder or pencil.

By my invention I seek first to provide a natural and easy rest for the thumb as well as for the first and second fingers while writing, which will facilitate the gliding of the hand from left to right with a maximum amount of freedom and a minimum amount of effort whether with a pen or pencil; second, to prevent juveniles from forming incorrect habits in relation to the fingers and thumb in holding the penholder or pencil; third, to compel the writer to use both nibs of the pen squarely on the paper; fourth, to prevent the "writers' cramp" by means of keeping the fingers on soft and pliable flanges, and, fifth, to preferably have the finger rests or flanges chased to prevent the perspiring of fingers, which so often makes it difficult to retain the ordinary penholder at length. When the penholder or pencil is correctly held, according to my judgment, the first, second, third, and fourth fingers should touch each other much in the same way or manner that they will assume if an egg— such as a small hen's egg, for instance—were to be pressed against the palm of the hand between the thumb and fingers, the small end of the egg being clasped by the little finger. The ends of the finger-nails should form regular and receding steps from one another, much the same as will appear when the egg is held in the hand if the palm is turned toward the face. The end of each of the four fingers will then be almost an equal distance from the center of the palm. The thumb should be so bent that the end of its nail will be nearly an inch from the end of the first finger-nail, with the thumb nearer the center of the palm than the fingers. With fingers and thumb thus placed not only is the holder easily sustained, but all the muscles which should be used in holding the penholder or pencil brought into play, while those not needed are not called upon.

By the position described the hand when required can easily be turned toward the left far enough to allow it to rest on the last two finger-nails, by means of which a free command of the hand is attained and maintained without any special effort.

The difficulty in securing correct penholding comes through the use of ill-shaped penholders, which allow the fingers and thumb to take any position, penholders which allow the fingers to slip, and which do not place and hold both fingers and thumb in proper relation with each other.

My invention provides means which in order to grasp the pen or pencil practically compels the user to grasp it in proper manner and to hold the fingers and thumb in correct position and which the moment the fingers have a tendency to assume an improper position will present such uncomfortable protuberances to his fingers as to immediately cause him to overcome such tendency.

The invention will now be fully described by reference to the accompanying drawings, and the novel features thereof will be particularly pointed out in the claims at the close of the specification.

In the drawings, Figure 1 is a side elevation of a penholder and pen and a guard attached to the penholder embodying my invention. Fig. 2 is a side elevation of a pencil having my improved guard attached thereto, similar to the guard shown in Fig. 1, but taken on the opposite side of the guard. Fig. 3 is a plan of Fig. 1. Fig. 4 is an end view of Fig. 1 with the pen removed. Fig. 5 is a cross-section on line 5 5 of Fig. 1. Fig. 6 is a cross-section on line 6 6 of Fig. 1. Fig. 7 is a side elevation of the penholder with the guard and pen removed.

1 represents the guard, which is a tubular sleeve to fit over the penholder or pencil, and 2 represents a penholder. When employed with a penholder 2, the penholder is preferably formed with a reduced stem 3 to fit the bore of the sleeve, and thus forming a shoulder 4, against which the rear end of the sleeve 1 abuts. Preferably the exterior diameters of the sleeve and the penholder are the same at the point of conjunction, forming a flush joint.

The stem 3 is formed with a pen-slot 5 to receive the pen. Preferably the top of the crown of the pen-slot should not be above the center of the end of the stem.

The sleeve or guard 1 is preferably composed of rubber or other suitable substance. It is formed with three finger-rests 6, 7, and 8 for the forefinger, second finger, and thumb, respectively, and when used with a penholder the sleeve should be firmly secured to the stem 3 by cement or otherwise to prevent removal or turning, so that the pen will always have a fixed relation to the finger-rests.

The forefinger-rest 6 is the nearest to the forward end of the sleeve and should be at or nearly at the end. It should be directly on top of the sleeve when the pen is in writing position, with both nibs of the pen square on the paper—that is, a straight line 9, connecting both sides of the pen-slot, should be horizontal and a plane or a line 10 drawn from the middle of line 9 at right angles thereto will pass through the top of the crown of the pen-slot and the middle of the stem to the middle line 11 of the rest 6.

The rest 6 is a concaved lug, preferably elongated to receive the soft part of the first joint of the forefinger and has an inclined wall all the way around it to form a cup for the finger to guard against slipping of the finger lengthwise or sidewise.

The rest 7 for the second finger is about one hundred and twenty degrees around from the rest 6 and somewhat farther back from the end of the sleeve than is the rest 6 and is concaved from front to rear—that is, viewed axially of the sleeve, but not laterally—forming a transverse groove preferably at a slightly-acute angle to the axis of the sleeve to receive the side of the second finger extending crosswise of the sleeve. The groove extends transversely of the sleeve, and although concaved in the lengthwise direction of the sleeve—that is, crosswise of the groove—the bottom of the groove is straight lengthwise of the groove.

The rest 7 is but slightly in rear of the rest 6, being just about far enough so that the two fingers will come in contact with each other.

The rest 8 for the thumb is circumferentially about midway between the two finger-rests 6 and 7 and is farther to the rear than is the rest 7. It is concaved to receive the fleshy part of the thumb, the thumb being preferably turned a little to one side and lying at an acute angle to the axis of the sleeve in the direction indicated by the dotted line 12, the lip of the rest being somewhat cut off at the side 13 to accommodate the thumb.

Preferably in the rear of the forefinger-rest 6 there is a rib or ridge 14. If the writer has a tendency to draw the finger back from the rest 6 or to let the finger lie too flat on the penholder, the finger will press on the ridge 14, and this will be so uncomfortable as to immediately draw his attention to the improper holding of the penholder or else he will involuntarily put the fingers back in the proper position.

In front of the second-finger rest 7 there is placed a rib 15 to serve as a reminder for the second finger. This is placed in front instead of in the rear of the rest 7, because there is more tendency for that finger to move forward.

In front of the thumb-rest 8 there is a rib 16 for a similar reminder for the thumb.

It is obvious that if it were possible to construct the penholder and rests as one integral piece, having the finger-rests as described, and to form the pen-slot in the end it would come within the scope of this invention as much as if the guard be made as a sleeve which is then fitted onto the penholder; but practically it is not easy to make them integral.

When the sleeve is used with a pencil 34, as shown in Fig. 2, it should be sufficiently friction-tight on the pencil to not slip too easily while in use, but should be capable of being moved back as the pencil is worn and requires sharpening from time to time.

What I claim is—

1. A finger-guard for a penholder or pencil having lugs which form fixed rests respectively for the forefinger, second finger and thumb, the forefinger-rest having a cupped-out depression for the end of the finger, the second-finger rest being located circumferentially about one hundred and twenty degrees therefrom and consisting of a groove extending transversely to the axis of the holder and being concaved in a direction lengthwise of the holder forming parallel front and rear walls which engage the sides of the finger lying therein transversely of the holder; the thumb-rest being located circumferentially about one hundred and twenty degrees from said forefinger-rest on the opposite side from the second-finger rest, and having a cupped-out depression for the end of the thumb, said rests being in fixed relation to each other, the forefinger-rest and the thumb-rest having a lip entirely around the edge; the second-finger rest having walls only on the front and rear and being open at the ends.

2. In combination with a penholder, a finger-guard having lugs which form rests respectively for the forefinger, second finger and thumb, the forefinger-rest being located near the forward end of the holder and having a concaved depression for the finger; the second-finger rest being located slightly in the rear of said first rest and circumferentially about one hundred and twenty degrees therefrom, and consisting of a groove extending at a slightly-acute angle to the axis of the holder and being concaved in a direction lengthwise of the holder; the thumb-rest being located slightly in rear of said second-finger rest and circumferentially about one hundred and twenty degrees from said forefinger-rest on the opposite side from the second-finger rest and having a concaved depression for the thumb, said rests all being in fixed relation to each other and fixed to the holder, the penholder being formed with a pen-slot the middle of which is in a plane passing through the axis of the holder and the median line of the forefinger-rest.

3. A finger-guard for a penholder or pencil having fixed rests respectively for the forefinger, second finger and thumb, the forefinger-rest being located near the forward end of the holder, the second-finger rest being slightly in the rear of said first rest and circumferentially about one hundred and twenty degrees therefrom, and the thumb-rest being slightly in rear of the second-finger rest and circumferentially about one hundred and twenty degrees from said forefinger-rest on the opposite side from the second-finger rest, a ridge in rear of the forefinger-rest and ridges in front of the second-finger rest and thumb-rest to respectively engage the fingers and thumb when either is moved from its proper position.

In testimony whereof I have affixed my signature in presence of two witnesses.

WILLIAM A. WHITEHOUSE.

Witnesses:
WILLIAM A. COPELAND,
ROBERT WALLACE.